United States Patent
Hughes et al.

(10) Patent No.: US 11,886,283 B2
(45) Date of Patent: Jan. 30, 2024

(54) AUTOMATIC NODE CRASH DETECTION AND REMEDIATION IN DISTRIBUTED COMPUTING SYSTEMS

(71) Applicant: INTERNATIONAL BUSINESS MACHINES CORPORATION, Armonk, NY (US)

(72) Inventors: Kevin Allen Hughes, Cedar Park, TX (US); Juan Jose Alvarez, Rochester, MN (US); Malcolm S. Allen-Ware, Tucson, AZ (US); Charles Lefurgy, Austin, TX (US); Guillermo Jesus Silva, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 17/708,235

(22) Filed: Mar. 30, 2022

(65) Prior Publication Data
US 2023/0315560 A1     Oct. 5, 2023

(51) Int. Cl.
*G06F 11/07*     (2006.01)
(52) U.S. Cl.
CPC ...... *G06F 11/0793* (2013.01); *G06F 11/0709* (2013.01); *G06F 11/079* (2013.01)
(58) Field of Classification Search
CPC . G06F 11/0709; G06F 11/079; G06F 11/0793
See application file for complete search history.

(56) References Cited

U.S. PATENT DOCUMENTS

| 8,069,371 | B2 * | 11/2011 | Sengupta | G06F 11/0748 |
| | | | | 714/38.14 |
| 9,026,860 | B2 | 5/2015 | Akirav et al. | |
| 10,223,183 | B2 | 3/2019 | Xie et al. | |
| 10,761,926 | B2 | 9/2020 | Chien | |
| 10,846,183 | B2 | 11/2020 | Rao et al. | |
| 10,855,464 | B2 | 12/2020 | Nirwal | |
| 11,194,635 | B2 | 12/2021 | Carlen et al. | |
| 11,379,295 | B1 * | 7/2022 | Woodhouse | G06F 11/1484 |

FOREIGN PATENT DOCUMENTS

| AU | 2021104045 | 9/2021 |
| EP | 3054383 | 8/2016 |
| EP | 3620922 | 3/2020 |

OTHER PUBLICATIONS

Mell et al., "The NIST Definition of Cloud Computing", NIST, Special Publication 800-145, Sep. 2011, 7 pages.
(Continued)

*Primary Examiner* — Joseph R Kudirka
(74) *Attorney, Agent, or Firm* — Rakesh Roy; Andrew D. Wright; Calderon Safran & Cole P.C

(57) ABSTRACT

A computer-implemented method includes: detecting, by one or more processors, an indication that suggests a node has crashed, wherein the node is included in a distributed computing environment; in response to the detecting, confirming by the one or more processors whether the node has crashed by performing a set of probes on the node; and in response to the confirming that the node has crashed, initiating by the one or more processors a remediation of the node.

20 Claims, 12 Drawing Sheets

(56) References Cited

OTHER PUBLICATIONS

Fortinet, "Fortinet and Nozomi Networks Comprehensive OT Security Solution", 2020, 4 pages.
Kaspersky, "Kaspersky Industrial Cybersecurity: Solution Overview", 2016, 14 pages.
Winkler, "Securing the Cloud-Cloud Computer Security Techniques and Tactics", 2018, 315 pages.
Anonymously, "A Method and System to Efficiently Orchestrate Continuous Integration and Continuous Deployment in an Enterprise IaaS Cloud Environment", IP.com, IPCOM000245585D, Mar. 21, 2016, 12 pages.
Anonymously, "Hardware Resources Orchestration for Cloud Infrastructure Management Based on Auto-Aware Wireless Sensor System", IP.com, IPCOM000267521D, Nov. 1, 2021, 7 pages.
Anonymously, "DevOps Robotic Process Automation and Artificial Intelligence", IP.com, IPCOM000264994D, Feb. 16, 2021, 7 pages.
Kennedy, "Explaining the Baseboard Management Controller or BMC in Servers", https://www.servethehome.com/explaining-the-baseboard-management-controller-or-bmc-in-servers/, Sep. 27, 2018, 9 pages.
Anonymously, "Serial over LAN access", https://www.ibm.com/docs/en/datapower-gateway/10.0.1?topic=access-serial-over-lan, Feb. 21, 2022, 2 pages.
Anonymously, "Kernel panic", Wikipedia, https://en.wikipedia.org/wiki/Kernel_panic, accessed Mar. 13, 2022, 6 pages.
Anonymously, "BusyBox", Wikipedia, https://en.wikipedia.org/wiki/BusyBox, accessed Mar. 13, 2022, 9 pages.
Dehors, "Storing crash data of the Linuxkernel for post-crash debugging", https://www.linuxembedded.fr/2019/12/storing-crash-data-of-the-linux-kernel-for-post-crash-debugging, Dec. 23, 2019, 13 pages.
Anonymously, "Kubernetes Components", https://kubernetes.io/docs/concepts/overview/components/, accessed Mar. 14, 2022, 4 pages.
Anonymously, "kdump (Linux)", https://en.wikipedia.org/wiki/Kdump_(Linux), accessed Mar. 30, 2022, 3 pages.

\* cited by examiner

US 11,886,283 B2

AUTOMATIC NODE CRASH DETECTION AND REMEDIATION IN DISTRIBUTED COMPUTING SYSTEMS

BACKGROUND

Aspects of the present invention relate generally to distributed computing systems and, more particularly, to automatic node crash detection and remediation in distributed computing systems.

A kernel panic is a safety measure taken by an operating system's kernel upon detecting an internal fatal error in which either it is unable to safely recover or continuing to run the system would have a higher risk of major data loss. The kernel routines that handle panics are generally designed to output an error message to the console, dump an image of kernel memory to disk for post-mortem debugging, and then either wait for the system to be manually rebooted, or initiate an automatic reboot. Some servers are configured to load a crash kernel after a panic occurs. The crash kernel collects crash dump data and offloads it to a remote storage service.

SUMMARY

In a first aspect of the invention, there is a computer-implemented method including: detecting, by one or more processors, an indication that suggests a node has crashed, wherein the node is included in a distributed computing environment; in response to the detecting, confirming by the one or more processors whether the node has crashed by performing a set of probes on the node; and in response to the confirming that the node has crashed, initiating by the one or more processors a remediation of the node.

In another aspect of the invention, there is a computer program product including one or more computer readable storage media having program instructions collectively stored on the one or more computer readable storage media. The program instructions are executable to: detect a node has an unavailable status, wherein the node is included in a cluster in a distributed computing environment; in response to the detecting, confirm whether the node has crashed by performing a set of probes on the node; and in response to the confirming that the node has crashed, initiate a remediation of the node.

In another aspect of the invention, there is a system for automatically detecting and remediating a node crash in a distributed computing environment. The system includes one or more processors, one or more computer readable storage media, and program instructions collectively stored on the one or more computer readable storage media. The program instructions are executable by the one or more processors to: detect an orchestration status of nodes in a cluster; responsive to detecting that one of the nodes has a status of unavailable, perform a set of probes on the one of the nodes that confirm whether the one of the nodes has experienced a kernel crash; and responsive to confirming that the one of the nodes has experienced a kernel crash, automatically removing the one of the nodes from the cluster, powering down the one of the nodes, resetting the one of the nodes to a default state, and notifying an operator that the one of the nodes experienced the kernel crash.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
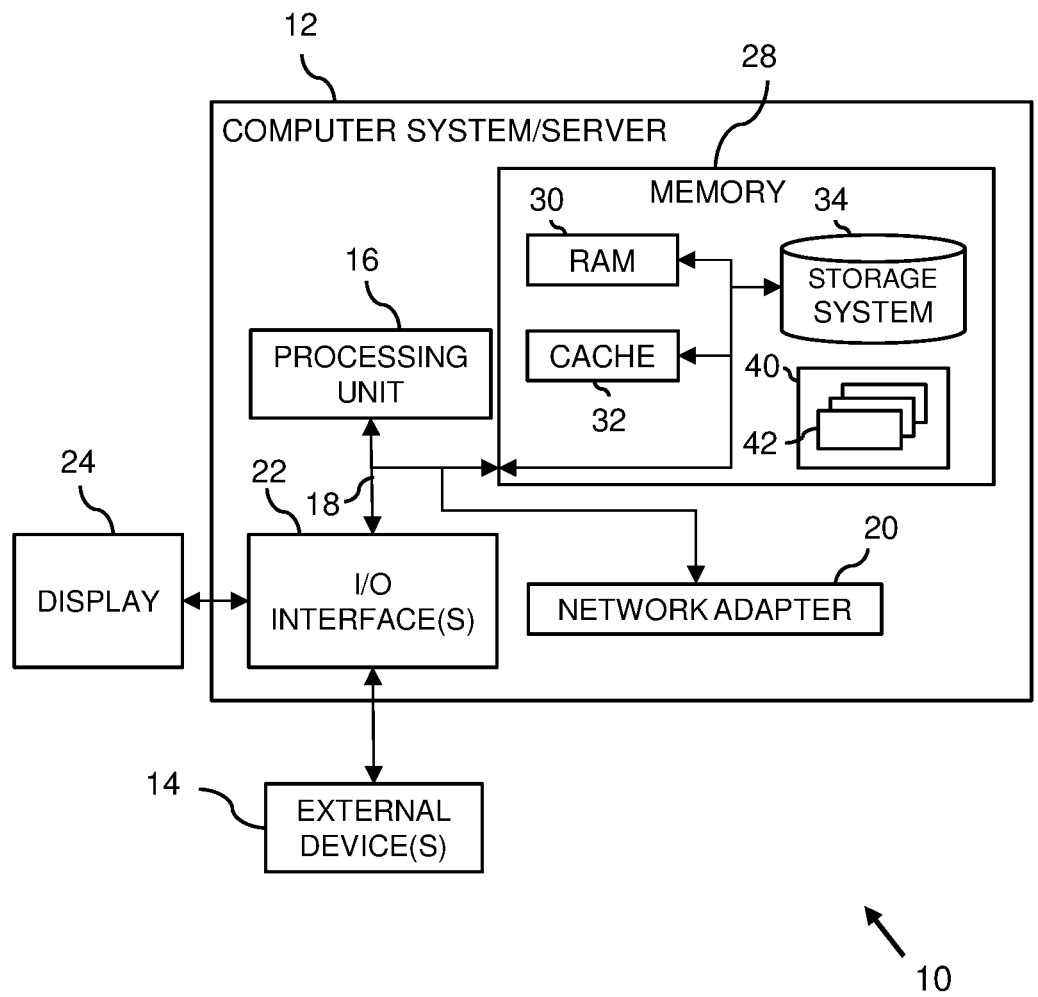
FIG. 1 depicts a cloud computing node according to an embodiment of the present invention.

Aspects of the present invention relate generally to distributed computing systems and, more particularly, to automatic node crash detection and remediation in distributed computing systems. In accordance with aspects of the invention, a control node that detects a preliminary indication of a node crash uses a set of probes to confirm whether the node has actually crashed. In embodiments, the control node initiates remediation of the node only after confirming by one or both probes that the node has indeed crashed. In this manner, implementations of the invention minimize the occurrence of initiating costly remediations for false positive indications of a node crash.

A control node in a server cluster loses normal communication with another cluster node that has crashed. For example, when a node in a cloud system cluster experiences a kernel crash, this usually marks the node as unavailable to the system for virtual machine (VM) scheduling. In a specific example using Kubernetes, a node that has experienced a kernel crash no longer has kubelet communications with the control plane in the cluster and, as a result, is marked by the control plane as "NotReady" in the Kubernetes cluster node status. Many systems treat this event as a crash of the node and institute remediation of the node as a result. Remediation is a costly process in that it involves manual inspection and analysis to detect that a crash has indeed occurred and that a crash dump has been created.

However, loss of normal communications alone does not deterministically indicate that a node has crashed. This is because there may be other reasons that normal (e.g., expected) communications from a node are not received by the control node. For example, a communication link between the node and the control node might be broken even though the node is otherwise performing normally (i.e., not crashed). In another example, the agent on the node (e.g., the kubelet in the Kubernetes example) may be experiencing a problem that affects the communication even though the node is otherwise performing normally (i.e., not crashed). False positives like these two examples can result in starting the manually intensive remediation process for a node that is not crashed, which is an inefficient use of enterprise resources.

There is currently no way other than manual inspection and analysis to detect that a node crash has occurred. Moreover, there is currently no way to correlate a node kernel crash with a loss of normal node communications. As a result, detecting an absence of normal node communications is an unreliable way to perform node crash detection in distributed computing systems. In the particular example of a Kubernetes system, deeming a node as being crashed based on the node being marked as NotReady is an unreliable method of crash detection that leads to false positives and unnecessary remediation.

Aspects of the invention address this problem by providing systems, methods, and devices that detect an initial indication of a node crash and, in response to the detecting, utilize plural probes to confirm that the node has indeed crashed prior to initiating remediation. In embodiments, the probes include: a first probe including an attempted communication that is directed specifically to a crash kernel that is expected to be present on the node if the node is actually crashed; and a second probe to a console of the node to determine whether a particular prompt of the crash kernel is present in the console. In embodiments, if one or both of these probes confirms the presence of the crash kernel running on the node, then this confirms that the node is indeed crashed, and that remediation can begin. In this manner, implementations provide an improvement over existing systems that rely only on a loss of normal (e.g., expected) communication with a node to deem that the node has crashed. In particular, implementations of the invention provide an improvement over these systems by reducing or completely eliminating the false positives that such systems suffer from, thereby reducing the expenditure of resources for unnecessary remediation when nodes aren't actually crashed.

As described herein, in one embodiment there is a system and method for automatically, reliably, and securely detecting deterministically that a node kernel crash has occurred and taking action to remediate that node. In this embodiment, a crash kernel runs a utility called BusyBox on the crashed node, notifies a node crash detection and remediation (NCDR) microservice asynchronously, responds synchronously to probes from the NCDR microservice, collects crash dumps, and pushes the crash dumps to the NCDR microservice. In this embodiment, the NCDR microservice communicates with a BusyBox crash kernel in a first probe and with a console of the node over SOL in a second probe to definitively detect that a kernel crash has occurred on the node. In this manner, the NCDR microservice provides primary crash detection trigger and confirmation. In this embodiment, an NCDR microservice component monitors the state of nodes in the orchestration system (e.g., in a Kubernetes cluster) and provides a secondary node crash detection trigger. In this embodiment, an NCDR microservice component provides automatic node removal remediation steps to be taken when a definitive node crash is detected. In this embodiment, an NCDR microservice component provides an automatic way to recover and add the crashed node back to the cluster. In this embodiment, the NCDR microservice is deployed within the control plane cluster, which increases availability by taking advantage of orchestration features. In this embodiment, all microservice state information is stored in resilient etcd database.

In another aspect, there is a method for automatically detecting and remediating a node crash in an orchestrated cloud environment, the method comprising: detecting orchestration node status for a plurality of nodes; for a node having an unavailable status, performing a set of probes of the node to determine whether the node has experienced a kernel crash; in response to determining that the node has experienced a kernel crash, automatically removing the node from an active cluster, powering down the node, resetting the node to a default state, and notifying operations to remove the node from inventory (e.g., via a service ticket). In this method, the set of probes may include: a Serial Over LAN (SOL) probe of a console-based tool installed on the node (e.g., a Baseboard Management Controller (BMC) console); and an application programming interface (API) call to the BusyBox utility running in the crash kernel installed on the node (e.g., BusyBox in crash kernel).

In another aspect of the invention a method includes generating asynchronous notifications from crashed nodes and monitoring the asynchronous notifications from crashed nodes. The method may include automatically detecting orchestration node status and queueing unavailable nodes up for further analysis. The method may include probing for nodes that have experienced a kernel crash but not reported in via asynchronous notification. The probing can include a serial console probe of the suspected crashed node to confirm the crash and automatically retrieve kernel crash information. The probing can also include BusyBox REST API calls to confirm the crash and automatically retrieve kernel crash information. The method may include redundant use of these systems for higher reliability of retrieving crash data. The method may include correlating unavailable node status reported from the orchestration with node kernel crash detection probes. The method may include a process of initial remediation to automatically remove the node from the active cluster, power it down, reset it to default state, and notify operations to remove from inventory and create follow up actions. The method may include utilizing a single encrypted secure access path for communicating with the crashed node via out of band networking path with secure password and SOL to host.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
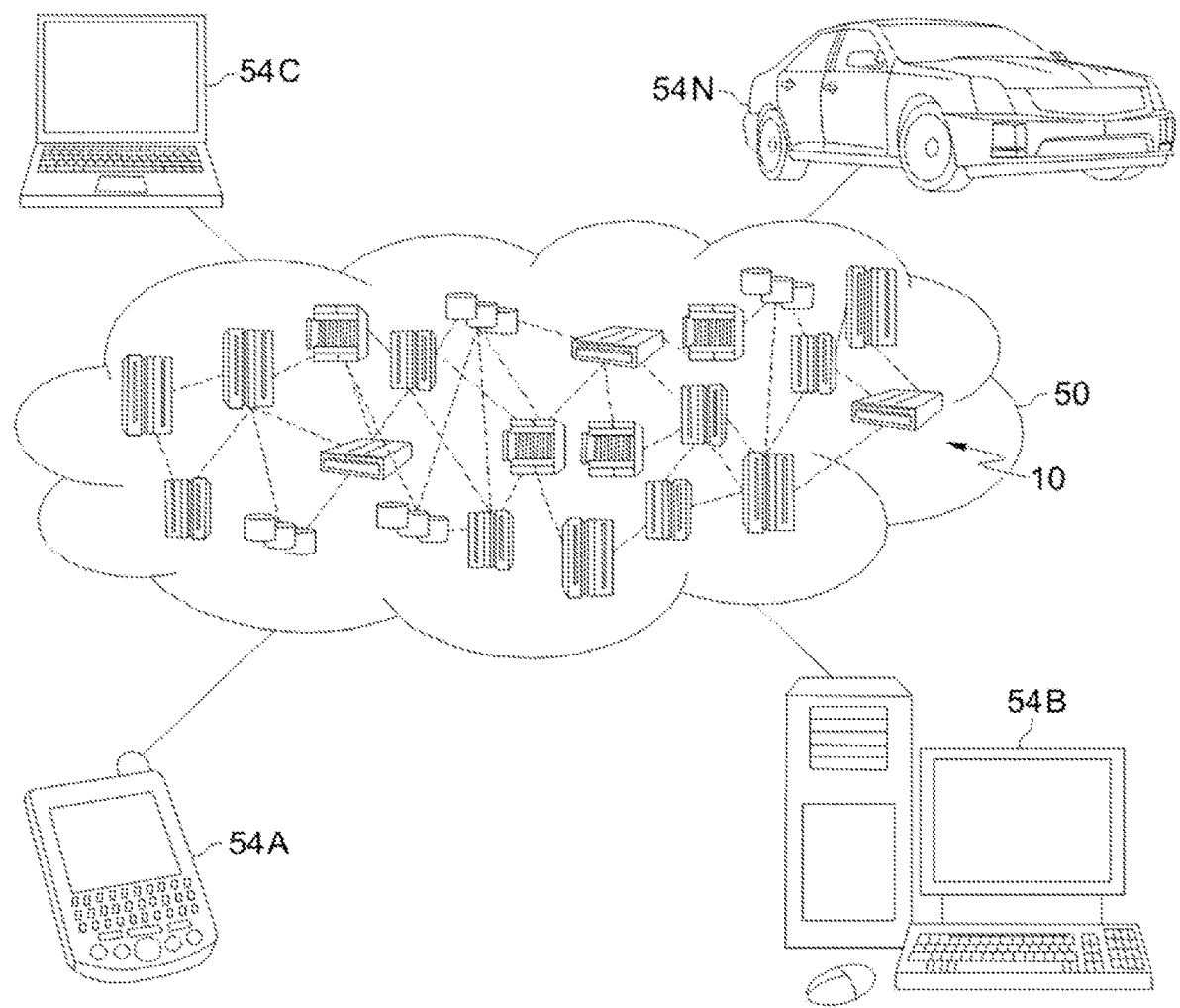
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
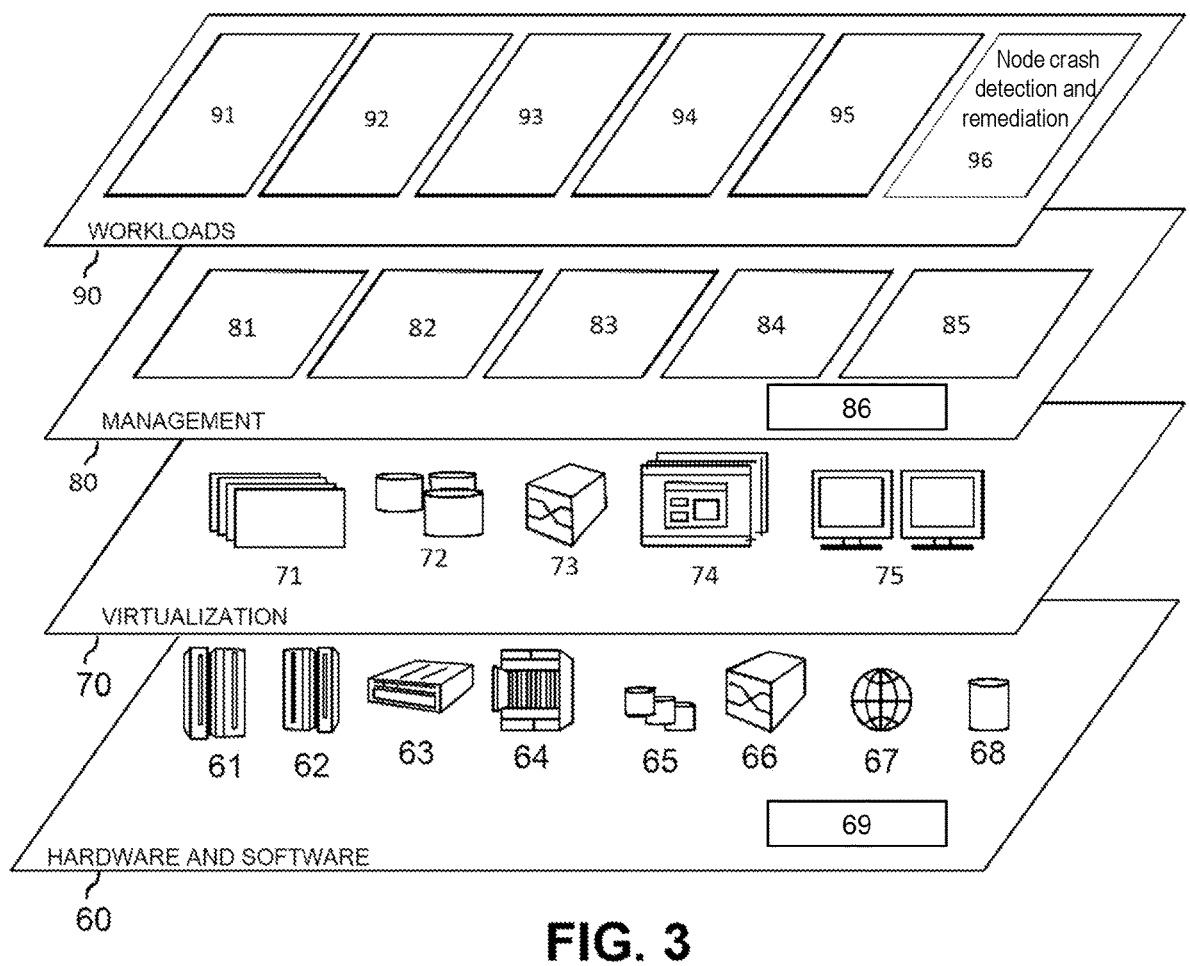
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. One or more hardware and/or software components 69 that perform one or more functions of the node crash detection and remediation (NCDR) described herein may be provided in the hardware and software layer 60.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. One or more functions of the node crash detection and remediation (NCDR) described herein may be provided by management layer 80 as indicated at 86.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and node crash detection and remediation 96.

Implementations of the invention may include a computer system/server 12 of FIG. 1 in which one or more of the program modules 42 are configured to perform (or cause the computer system/server 12 to perform) one of more functions of the node crash detection and remediation 96 of FIG. 3. For example, the one or more of the program modules 42 may be configured to: detect a node has an unavailable status, wherein the node is included in a cluster in a distributed computing environment; in response to the detecting, confirm whether the node has crashed by performing a set of probes on the node; and in response to the confirming that the node has crashed, initiate a remediation of the node.

Figure 4:
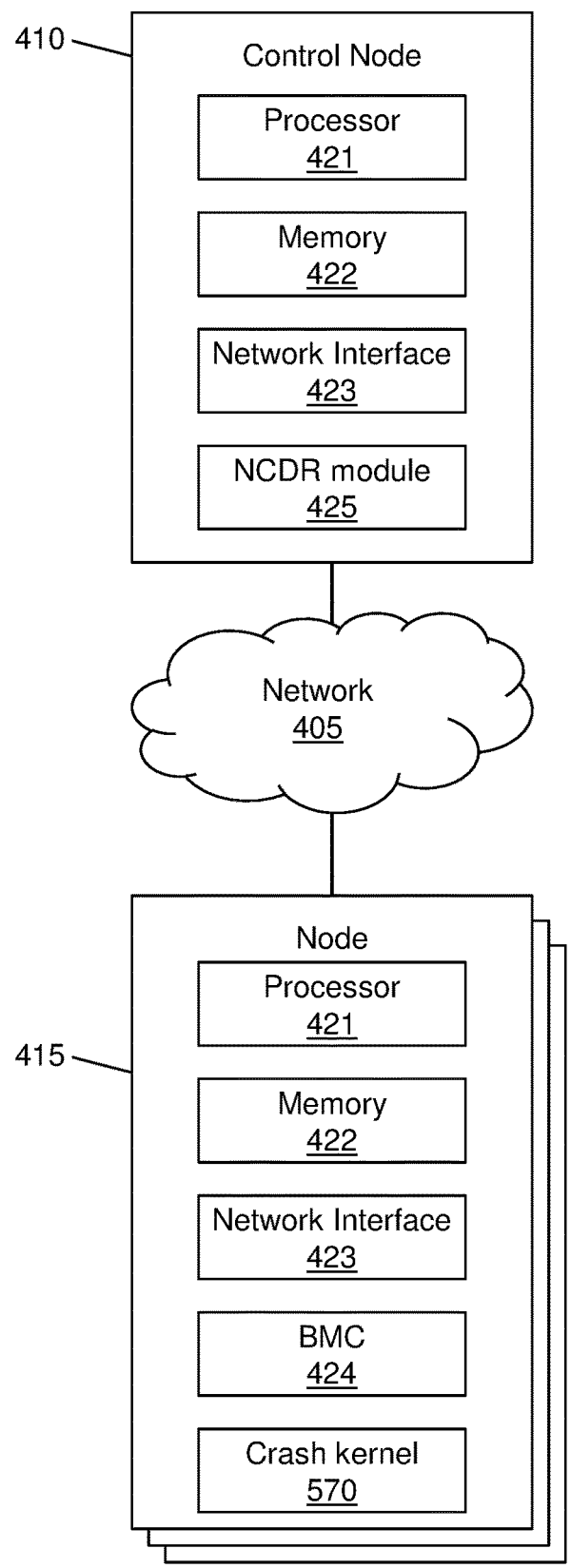
FIG. 4 shows a block diagram of an exemplary environment in accordance with an embodiment of the invention.

FIG. 4 shows a block diagram of an exemplary environment in accordance with aspects of the invention. In embodiments, the environment includes a network 405 that provides communication between a control node 410 and one or more nodes 415. The network 405 comprises any suitable arrangement of one or more communication networks including a LAN, WAN, and the Internet. In one exemplary implementation, the network 405 comprises cloud computing environment 50 of FIG. 2 and the control node 410 and nodes 415 each comprise a computing node 10 of FIG. 2. A single control node 410 may communicate with plural different nodes 415 in a cluster.

In embodiments, each of the control node 410 and the node 415 comprises a server computing device including one or more components of the computer system/server 12 of FIG. 1. For example, each of the control node 410 and the node 415 may comprise a server computing device that includes a processor 421 (e.g., processing unit 16 of FIG. 1), memory 422 (e.g., memory 28 of FIG. 1), and network interface 423 (e.g., network adapter 20 of FIG. 1).

In embodiments, the node 415 includes a baseboard management controller (BMC) 424 which is a separate processor that is configured to provide remote monitoring and management of the node 415. The BMC 424 may be accessed by the control node 410 via a dedicated or shared network interface 413. In one example, the BMC 424 has multiple connections to the node 415, giving it the ability to monitor hardware via sensors, flash BIOS/UEFI firmware, give console access via Serial Over LAN (SOL), power cycle the node 415, and log events. The BMC 424 may be used to access an SOL console of the node. The SOL console may comprise a console that displays the output of the serial port of the node (e.g., server). In embodiments, the node 415 may also run a crash kernel 570 as described herein with respect to FIG. 5.

In embodiments, the control node 410 comprises a node crash detection and remediation (NCDR) module 425, which may comprise one or more program modules such as program modules 42 described with respect to FIG. 1. The control node 410 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the NCDR module 425 is configured to perform one or more functions described herein including: listening for an indication that suggests the node 415 has crashed; in response to detecting such an indication, performing a set of probes on the node 415 to determine whether the node 415 has experienced a crash (e.g., a kernel crash); and, in response to determining the node 415 has experienced a crash, performing remediation steps on the node 415. As described herein, the remediation steps may include: automatically removing the node 415 from an active cluster, powering down the node 415, resetting the node 415 to a default state, and notifying operations to remove the node 415 from inventory (e.g., via a service ticket). In accordance with aspects of the invention, the set of probes include: an SOL probe of a console-based tool installed on the node 415 (e.g., via the BMC 424), and API call of a crash kernel installed on the node 415 (e.g., a crash utility crash kernel).

Aspects of the invention are described herein using an example in which the nodes include a Unix/Linux® operating system (OS) and run one or more containers (e.g., Kubernetes® containers). Embodiments of the invention are not limited to this example, and other operating systems and/or applications may be used in other implementations.

According to aspects of the invention, the node 415 establishes communication with the control node 410 in response to detecting a fatal error (e.g., a crash) in the node 415. In embodiments, the node 415 runs a crash utility that establishes a new kernel (referred to as a crash kernel) on the node 415. In embodiments, the crash kernel is configured to obtain information about the crash and communicate with the control node 410. The crash utility may comprise an application. In one example, the crash utility comprises BusyBox, which is a software suite that provides several Unix utilities in a single executable file. In this example, BusyBox runs as an instance of an OS kernel and has tools that allow it to save debug information about the crash and communicate this information to the control node 410, e.g., in the form of an asynchronous node crash notification and a crash dump. In embodiments, upon detecting the crash, a kexec function of the node 415 loads BusyBox through kernel hooks. The kexec function is a mechanism of the Linux kernel that allows booting a new kernel from the currently running kernel.

In embodiments, a bidirectional secure proprietary Hypertext Transfer Protocol Secure (HTTPS) communications path is created in the crash kernel to dump the crash data, as well as respond to synchronous node kernel crash processing state requests and send asynchronous periodic crash notifications published from the crash utility (e.g., the BusyBox application). This provides an initial asynchronous notification of the kernel crash and the crash data to the control node 410.

In embodiments, additionally, a reliable and secure SOL connection is made to the SOL console of the node 415 via the BMC 424 using the internal management network. In embodiments, the SOL console response is used to further detect the state of the node 415 and provide a deterministic confirmation of the node crash state. In embodiments, this is leveraged to prevent unintentional remediation of a wrong or non-crashed node.

According to aspects of the invention, the NCDR module 425 comprises a cloud microservice that listens for asynchronous crash notifications and crash dumps from the crash utility running on the crash kernel of node 415. In embodiments, receiving this notification and/or an incoming crash dump provides one level of determinacy whether the node 415 has had a kernel crash, as it is generally assumed that the only way the crash utility can send such a notification or crash dump is if the crash utility is running on the crash kernel and the node 415 is crashed. In embodiments, the system detects and handles this asynchronous notification and crash condition automatically.

According to aspects of the invention, the NCDR module 425 talks to the orchestration provider and monitors node state in the cluster. In embodiments, when a node is detected as unavailable (e.g., indicated as NotReady in Kubernetes) from the orchestration provider, a node monitoring component of the NCDR module 425 then adds this node to a list of potentially crashed nodes. In embodiments, the NCDR module 425 processes this list to determine whether an asynchronous notification or incoming crash dump for this node has been received independently, which serves as further confirmation of node state. In embodiments, when an asynchronous notification or incoming crash dump has not been received for a node included in the list of potentially crashed nodes, this triggers a probe of the node via HTTPS as well as over the SOL console probe. In embodiments, when a node is found unavailable from the orchestration provider, but no evidence of a crash is detected, then this node is not processed by the NCDR module 425.

In embodiments, the node readiness state is detected using an agent on the node 415 that communicates a status of the node 415 to the control node 410. One example of an agent is a kubelet running on the node 415 that interfaces with an API accessible monitoring system running on the control node 410.

According to aspects of the invention, the NCDR module 425 performs separate HTTPS and SOL based probes to determine whether a node 415 has definitively had a kernel crash. In embodiments, if no asynchronous notification or incoming crash data has been received for a node 415, but the node 415 is showing as unavailable (NotReady) in the orchestration, then the potentially crashed node is probed via both the HTTPS communications path and over the SOL console path to confirm the node state. If a response that is consistent with a crash is received via HTTPS or a prompt that is consistent with a crash is seen using the SOL console, this indicates deterministically that the unavailable node has had a kernel crash, but for some reason the asynchronous notifications and crash dump are not being received. In embodiments, by combining these pieces of information (i.e., the node is unavailable and/or showing as NotReady, the node is running a crash kernel responding to HTTPS probe, and the node console response appears over the SOL connection probe), the node can then be processed as definitely having crashed and needing to be remediated.

According to aspects of the invention, in response to determining that the node 415 has crashed, the NCDR module 425 performs remediation actions on the crashed node 415. In embodiments, the NCDR module 425 performs remediation actions including: remove the node 415 from cluster orchestration; retrieve the BMC error logs from the node 415; complete the crash dump data collection from the node 415; push the crash dump data collection to persistent storage (e.g., cloud object storage); rotate a BMC password for the node 415 back to default values for hardware verification; power down the node 415; and generate a service ticket for inventory processing and hardware verification notification.

Figure 5:
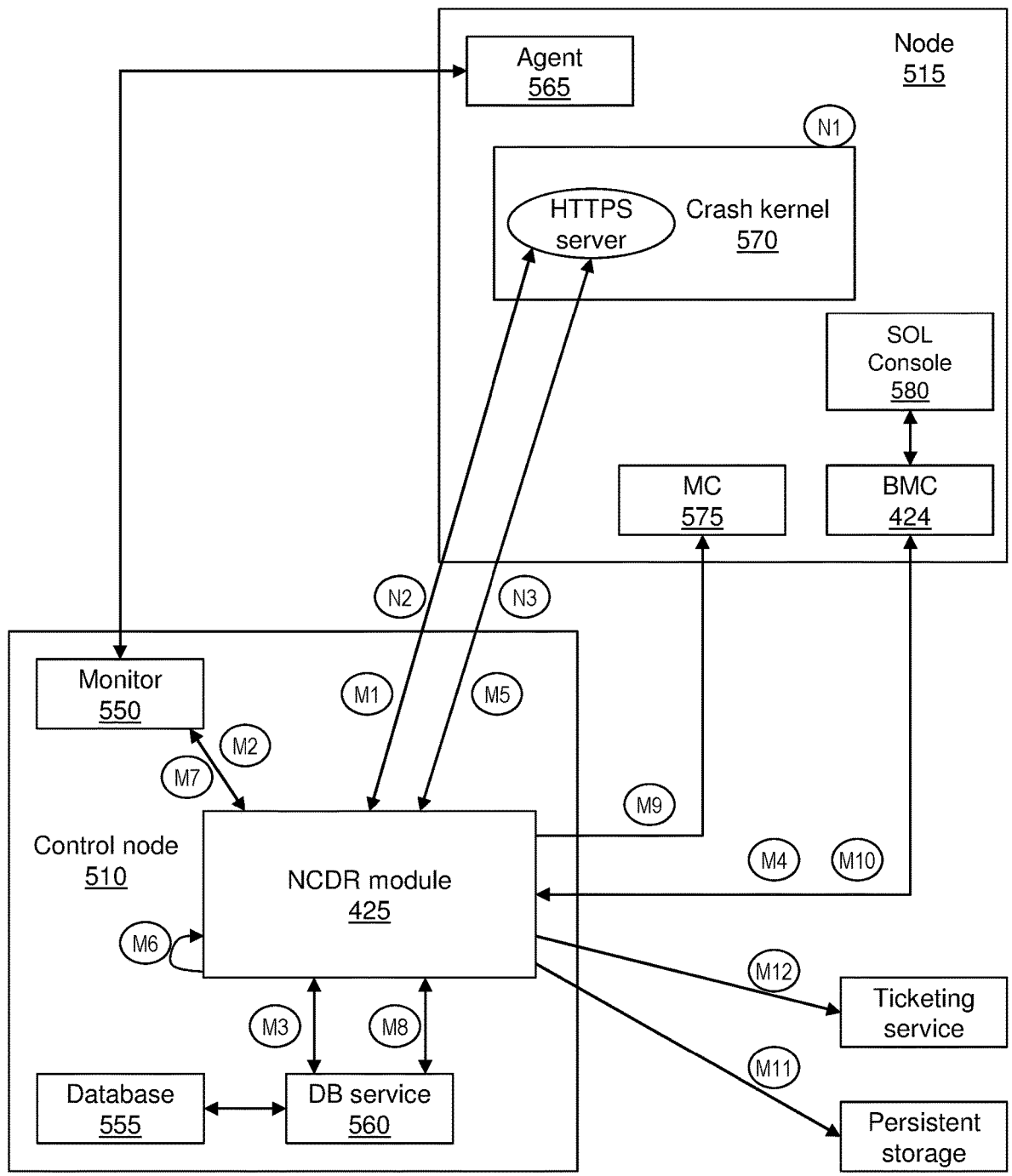
FIG. 5 shows a diagram of an exemplary system in accordance with an embodiment of the invention.

FIG. 5 shows a diagram of an exemplary system in accordance with aspects of the invention. In the example shown in FIG. 5, a control node 510 corresponds to and includes the elements of the control node 410 of FIG. 4 including the NCDR module 425, and a node 515 corresponds to and includes the elements of the node 415 of FIG. 4 including the BMC 424. In one example the control node 510 and node 515 are in a cluster in a distributed computing environment, the cluster may include plural worker nodes similar to node 515. The control node 510 may be part of the control plane of the cluster.

In the example shown in FIG. 5, the NCDR module 425 comprises a microservice running in a container on the control node 510. The container may be running in a pod on the control node 510. In a specific example, the container is running in a fleetman-bmmon (bare metal monitor) pod on the control node 515.

In the example shown in FIG. 5, the control node 510 includes a monitor 550, a database 555, and a database (DB) service 560 for accessing the database 555. In one example, the database 555 is a fleet database and the DB service 560 is a fleetman-rest-server microservice. In embodiments, the database 555 stores information including but not limited to: physical characteristics of the node 515; network characteristics of the node 515 (e.g., IP address of the node usable for the HTTPS probe; and credentials for accessing the node 515 (e.g., password for accessing the BMC 424, etc.). In embodiments, the DB service 560 is a microservice that the NCDR module 425 can call to query the database 555 to obtain information from the database 555.

In the example shown in FIG. 5, the node 515 includes an agent 565 that is configured to communicate with the monitor 550 of the control node 510 to provide a status of the node 515 to the control node 510. In one example, the agent 565 is a kubelet and the monitor 550 is an API accessible monitoring system (e.g., a kube-apiserver). In this example, in response to the monitor 550 not receiving an expected communication from the agent 565, the monitor 550 indicates that the node 515 has an unavailable status (e.g., NotReady).

In the example shown in FIG. 5, at step N1 the node 515 detects a crash and loads a crash kernel 570. In one example, kexec loads a BusyBox crash kernel at step N1. At step N2, the crash kernel 570 dumps crash data to the NCDR module 425 via HTTPS communication. At step N3, the crash kernel 570 sends periodic node crash POST notifications to the NCDR module 425 via HTTPS communication. Step N3 may also include the crash kernel 570 listening for REST API requests from the NCDR module 425 for processing status.

Still referring to the example shown in FIG. 5, at step M1 the NCDR module 425 listens over a secure internal management network connection for asynchronous crash notifications and crash dumps from the node 515. At step M2, in parallel to step M1, the NCDR module 425 listens for asynchronous notifications from the monitor 550 indicating that the node 515 is in an unavailable state (e.g., NotReady). At step M3, in response to being notified that the node 515 is in an unavailable state, the NCDR module 425 determines whether this node 415 is included in a list of nodes that have sent asynchronous crash notifications. Still in step M3, in response to determining that the node 515 is not included in the list of nodes that have sent asynchronous crash notifications, the NCDR module 425 obtains a management IP address of the node 515 from the database 555 using the DB service 560, and the NCDR module 425 then performs a first probe of the node 515 via HTTPS communication, e.g., using an API call to the crash kernel 570. At step M4, the NCDR module 425 performs a second probe of the node 515 using SOL communication to access the SOL console 580 of the node 515 via the BMC 424. At step M5, the NCDR module 425 begins tracking the status of the crash dump transfer via HTTPS communication (e.g., using a REST API).

In accordance with aspects of the invention, the NCDR module 425 uses the results of one or both of the first probe (at step M3) and the second probe (at step M4) to definitively determine whether the node 515 has crashed. In an example regarding the first probe, if the NCDR module 425 receives a response from the crash kernel 570 during the first probe, then this indicates that the crash kernel 570 is running on the node 515, which confirms that the node 515 has crashed. On the other hand, if the NCDR module 425 does not receive a response from the crash kernel 570 during the first probe, and instead receives no response or a response from a different kernel other than the crash kernel 570, then this indicates that the crash kernel 570 is not running on the node 515, which indicates that the node 515 has not crashed. In another example regarding the second probe, if the NCDR module 425 sees a crash kernel prompt in the SOL console 580 during the second probe, then this indicates that the crash kernel 570 is running on the node 515, which confirms that the node 515 has crashed. On the other hand, if the NCDR module 425 does not see the crash kernel prompt in the SOL console 580, and instead sees another prompt such as the normal prompt for this node, then this indicates that the crash kernel 570 is not running on the node 515, which indicates that the node 515 has not crashed. In embodiments, if one or both of the probes confirm that the node 515 has crashed, then the NCDR module 425 initiates remediation for the node 515. Conversely, if neither of the probes confirms that the node 515 has crashed, then the NCDR module 425 does not initiate remediation for the node 515.

With continued reference to the example shown in FIG. 5, steps M6-M12 represent remediation steps performed after confirming that the node 515 has crashed using the first and second probes. In embodiments, at step M6 the NCDR module 425 waits for the crash dump to complete. At step M7, the NCDR module 425 deletes the node 515 from the cluster. In embodiments, the monitor 550 maintains data that defines nodes included in a cluster, and deleting the node 515 from the cluster comprises removing (e.g., deleting) the node 515 from the definition of the cluster. At step M8, the NCDR module 425 obtains credentials for accessing the BMC 424 from the database 555. The credentials may include, for example, a username and password. In one example, at step M8, the NCDR module 425 obtains the current credentials, the previous credentials, and the default credentials for the BMC 424. At step M9, the NCDR module 425 powers down the node 515, e.g., using a management console (MC) 575. At step M10, the NCDR module 425 changes the credential (from step M8) to the default credential and updates the database 555 with the changed credential. At step M11, the NCDR module 425 stores the crash dump data in persistent storage. In one example, the NCDR module 425 pushes the crash dump data to cloud object storage. At step M12, the NCDR module 425 generates an operator crash notification to continue remediation. Step M12 may include, for example, adjusting a cluster YAML file and/or creating a ticket for a manual inspection of the node 515.

Figure 6:
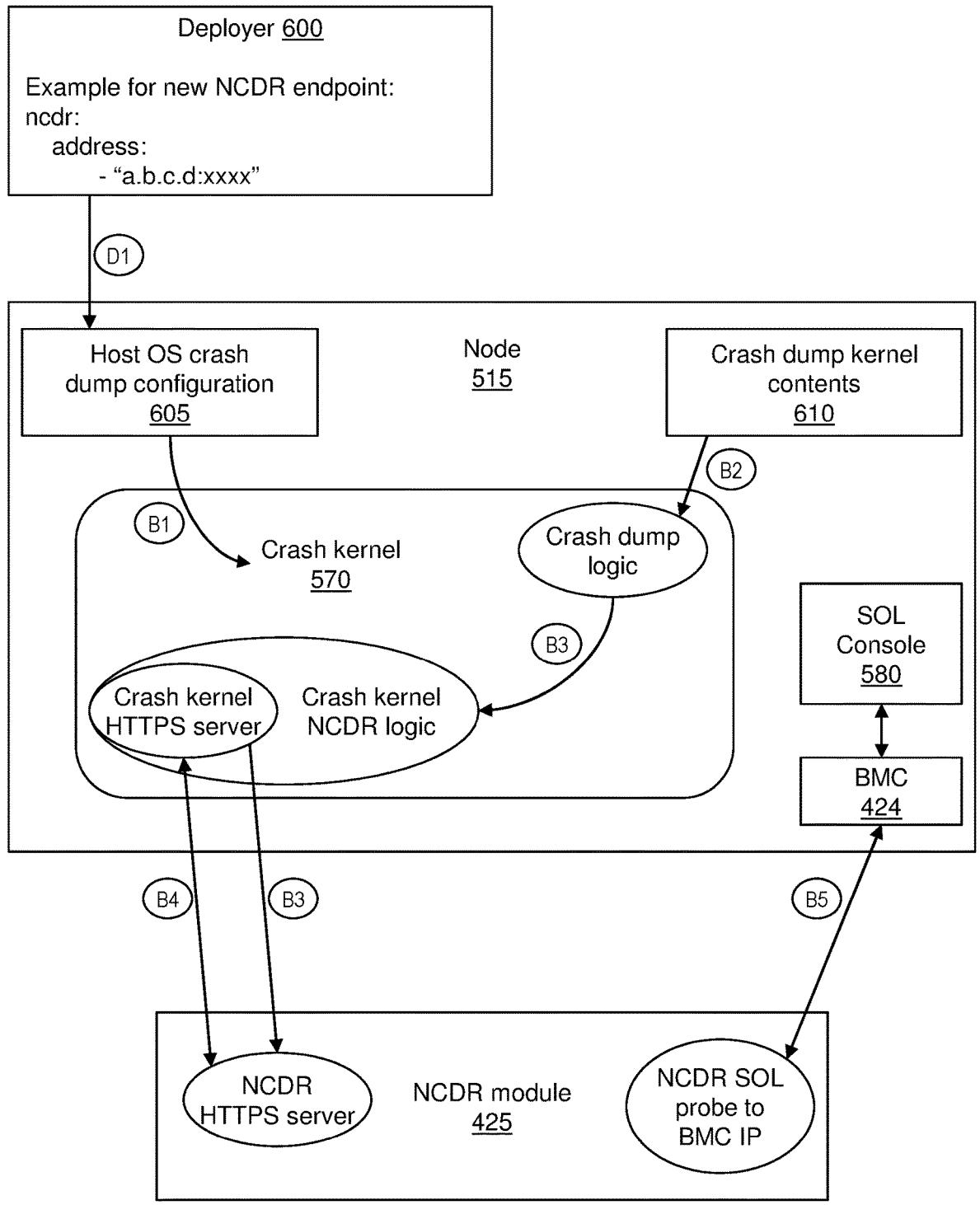
FIG. 6 illustrates exemplary details and functions of a node in accordance with an embodiment of the invention.

FIG. 6 illustrates exemplary details and functions of the node 515 of FIG. 5 in accordance with an embodiment of the invention. At step D1, deployer 600 deploys and configures a host OS on the node 515 with an endpoint for the NCDR module 425. Step D1 prepares the node 515 for handling kernel crash events by communicating with the NCDR module 425 as described herein. At step B1, when a kernel crash occurs on the node 515, the host OS 605 loads and runs the crash kernel 570. In one example, the host OS 605 uses kexec to load BusyBox running on the crash kernel 570. In embodiments, the crash kernel 570 is started up using the NCDR configuration that was deployed to the node 515 at step D1 by the host OS deployment process. At step B2, kernel crash dump information 610 is gathered by crash dump logic running in the crash kernel 570. At step B3, NCDR logic in the crash kernel 570 takes the crash dump information via the crash dump logic and sends this crash dump information to the NCDR module 425 over a secure and reliable management network HTTPS connection, e.g., utilizing a crash kernel HTTPS server function in the crash kernel 570. At step B4, an NCDR HTTPS server function in the NCDR module 425 listens for the crash kernel REST API probes and incoming kernel crash dumps on the configured IP address or port. In embodiments, the NCDR module 425 processes the crash dump for later persistent storage. At step B5, the NCDR module 425 connects to the SOL console 580 of the node 515 over the internal management network using SOL over the IP address of the BMC 424. Still in step B5, the NCDR module 425 uses this connection to the SOL console 580 to determine whether the node 515 is in the crash kernel 570. This provides a secondary fail-safe mechanism to verify the node information coming in the HTTPS path.

Figure 7:
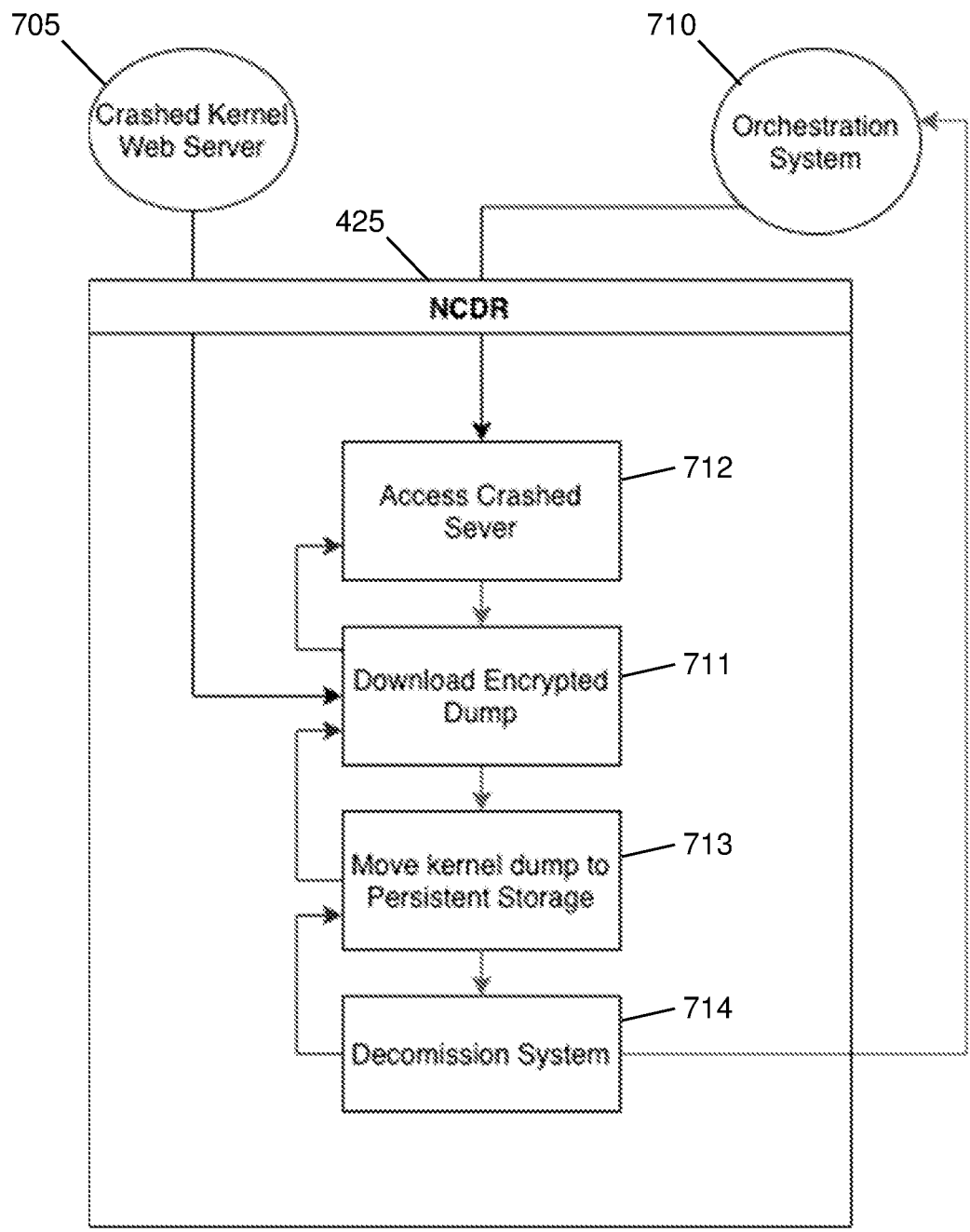
FIG. 7 shows a diagram of a system in accordance with an embodiment of the invention.

FIG. 7 shows a diagram of a system in accordance with an embodiment of the invention. In the example shown in FIG. 7, the crashed kernel web server 705 corresponds to node 515 of FIG. 5 and the orchestration system 710 is part of the control node 510 or the control plane of FIG. 5. In this example, at step 711 the NCDR module 425 downloads encrypted crash dump data from the crashed kernel web server 705. At step 712, the NCDR module 425 accesses the crashed kernel web server 705, e.g., using the first probe and second probe as described herein, to confirm whether the crashed kernel web server 705 has in fact crashed. At step 713, the NCDR module 425 moves the kernel crash dump data to persistent storage. At step 714, the NCDR module 425 decommissions the crashed kernel web server 705 and reports this to the orchestration system 710.

Figure 8:
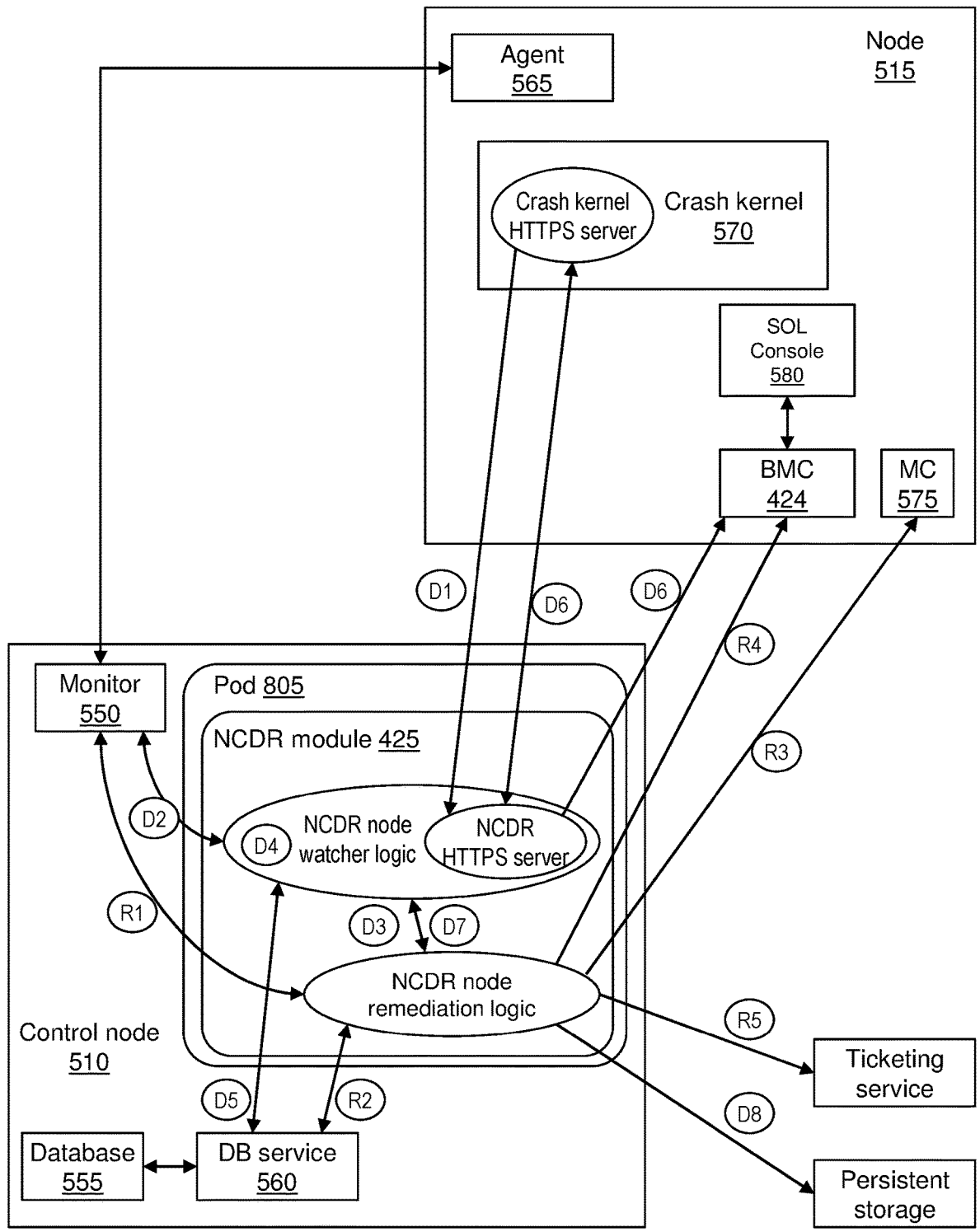
FIG. 8 illustrates exemplary details and functions of a control node and node in accordance with an embodiment of the invention.

FIG. 8 illustrates exemplary details and functions of the control node 510 and node 515 of FIG. 5 in accordance with an embodiment of the invention. In embodiments, the NCDR module 425 is a microservice that is run by a container that is included in a pod 805 on the control node 510. In one example, the pod 805 is a fleetman-bmmon pod in a control plane of the control node 510. In embodiments, the monitor 550 is a Kubernetes API (e.g., kube-apiserver) that is included in the control plane of the control node 510. In this example, the NCDR module 425 includes NCDR node watcher logic and NCDR node remediation logic.

With continued reference to the example shown in FIG. 8, at step D1 the NCDR module 425 starts up the NCDR node watcher logic, which listens for asynchronous node crash notifications and incoming crash dumps from nodes running a crash kernel 570. At step D2, the NCDR node watcher logic creates event handlers to obtain events information from the monitor 550 (e.g., Kubernetes events through the Kubernetes API). In one embodiment, at step D3 the NCDR node watcher logic receives an asynchronous node crash notification or an incoming crash dump and notifies the NCDR node remediation logic. At step D4, if a node is found in the unavailable state from the monitor 550, the NCDR node watcher logic compares the unavailable node against a list of nodes that have sent an asynchronous node crash notification or a crash dump to the NCDR module 425. At step D5, if the unavailable node is not found in the list, then the NCDR node watcher logic queries the BMC and management interface IP addresses from the database 555 using the DB service 560. At step D6, the NCDR node watcher logic initiates the first probe via HTTPS and the second probe via SOL, using the IP addresses obtained at step D5. In embodiments, the first probe includes the NCDR node watcher logic using an NCDR HTTPS server function to send a request to a crash kernel HTTPS server function of the crash kernel 570. In embodiments, the second probe includes the NCDR node watcher logic accessing the SOL console 580 via the BMC 424. If the node 515 is unavailable and one or both probes at step D6 confirm the crash, then at step D7 the NCDR node watcher logic initiates remediation with the NCDR node remediation logic. At step D8, the node crash dump data received by the NCDR module 425 is pushed to persistent storage.

Still referring to the example shown in FIG. 8, at step R1 the NCDR node remediation logic communicates with the monitor 550 to remove the node 515 from the cluster. In one example, the node 515 is removed from a Kubernetes cluster using the Kubernetes API. At step R2, the NCDR node remediation logic retrieves the default and current BMC 424 and MC 575 passwords from the database 555 using the DB service 560. At step R3, the NCDR node remediation logic powers down (e.g., powers off) the node 515 using the current BMC 424 password or the current MC 575 password. At step R4, the NCDR node remediation logic rotates the BMC 424 password to the default password. At step R5, the NCDR node remediation logic generates a service ticket, e.g., for triggering inventory adjustment and follow-on service hardware verification.

Figure 9:
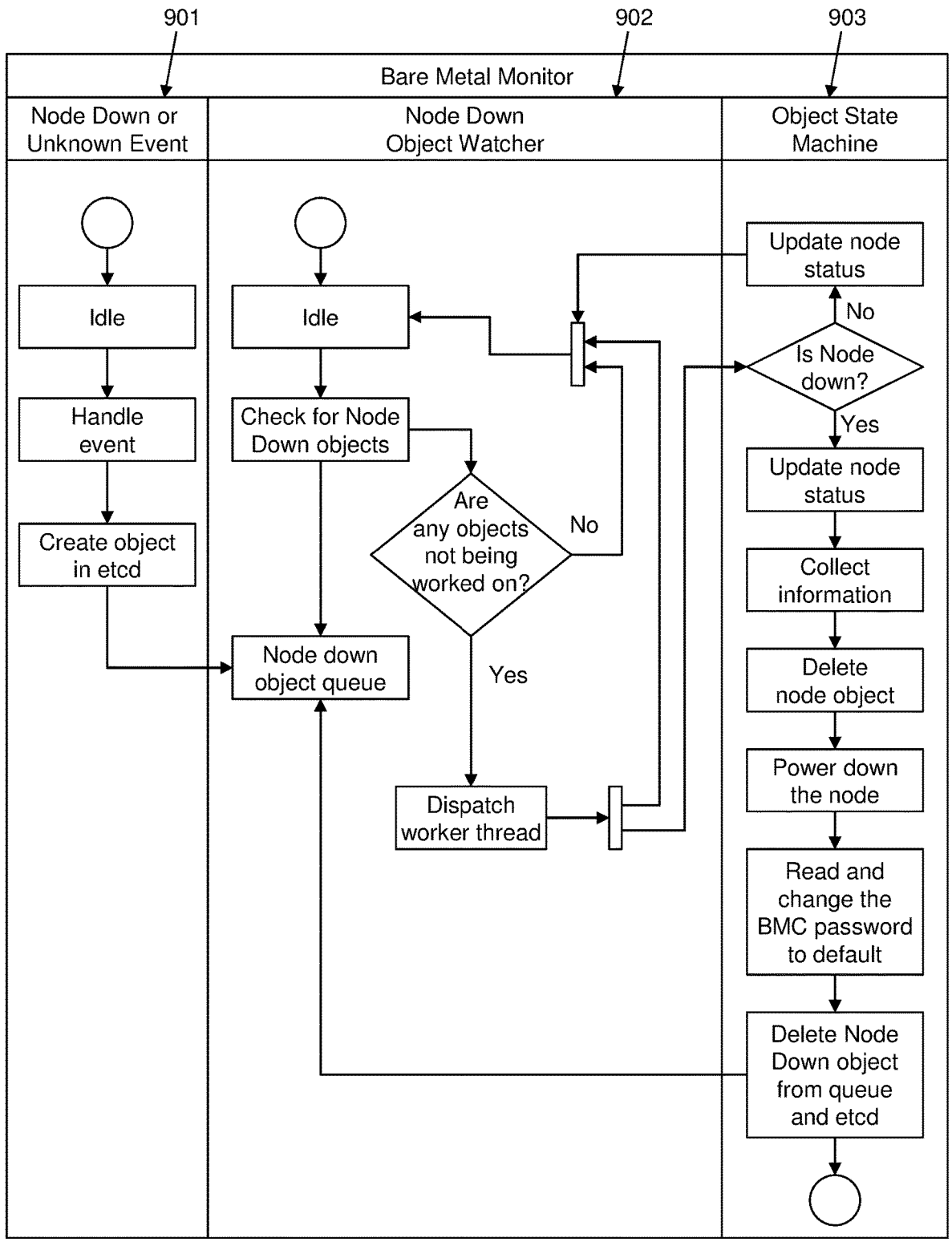
FIG. 9 shows an exemplary logic flow of a monitor of a control node in accordance with an embodiment of the invention.

FIG. 9 shows an exemplary logic flow of a bare metal monitor of a control node in accordance with an embodiment of the invention. In one example of FIG. 9, the bare metal monitor is a fleetman bare metal monitor of control node 510 of FIG. 5. In embodiments, the bare metal monitor of FIG. 9 is one of plural replicated instances that are capable of running in parallel to provide scalability of the NCDR service.

In the example shown in FIG. 9, column 901 depicts the bare metal monitor detecting and handling a node down or unknown event. In this example, the bare metal monitor goes from an idle state to handling the event, then to creating an object in a data store (e.g., an etcd data store), and then to adding the node to a node down object queue. As is understood in the art, etcd is an open source distributed key-value store used to hold and manage the information that distributed systems need to keep running. In one example, etcd manages the configuration data, state data, and metadata for Kubernetes. In embodiments, a node down event corresponds to a node (e.g., node 515) being in an unavailable state (e.g., NotReady).

With continued reference to the example shown in FIG. 9, column 902 depicts a node down object watcher function of the bare metal monitor. In this example, the bare metal monitor goes from an idle state to checking the node down object queue for node down objects. If there are node down objects in the node down object queue, then the bare metal monitor determines whether any of the node objects are not being worked on. The bare metal monitor dispatches a worker thread for any node down objects in the node down object queue that are not being worked on.

With continued reference to the example shown in FIG. 9, column 903 depicts an object state machine function of the bare metal monitor. In this example, the bare metal monitor uses the first and second probes described herein to confirm whether the node associated with the node down object has crashed. If the bare metal monitor cannot confirm that the node has crashed (e.g., is the node down? No), then the bare metal monitor updates the node status and returns to the watcher function of column 902. If the bare metal monitor does confirm that the node has crashed (e.g., is the node down? Yes), then the bare metal monitor initiates remediation for the crashed node including the steps of: updating the node status as down; collecting information about the node (e.g., from the database 555 of FIG. 5); deleting the node from the node cluster; powering down the node; reading and changing the BMC password to the default BMC password; and deleting the node down object from the ode down object queue and the etcd data store. In embodiments, the functions included on column 903 are performed by the NCDR module 425.

Figure 10:
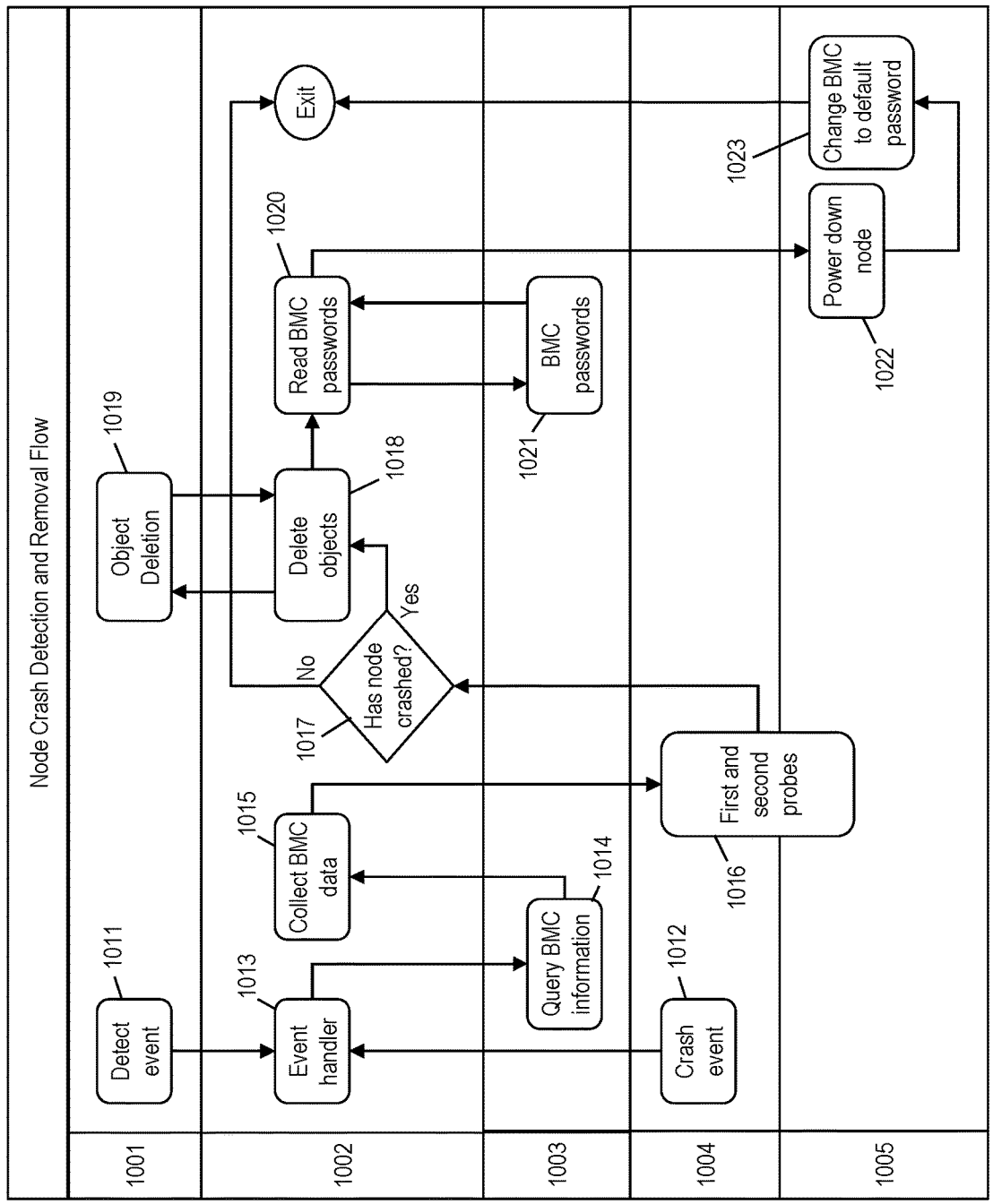
FIG. 10 shows a swim lane diagram of an exemplary method in accordance with an embodiment of the invention.

FIG. 10 shows a swim lane diagram of an exemplary method in accordance with aspects of the present invention. Steps of the method may be carried out in the environments of FIGS. 4 and 5 and are described with reference to elements depicted in FIGS. 4 and 5.

In the embodiment depicted in FIG. 10, row 1001 includes functions performed by an orchestration system of the control node 510, row 1002 includes functions performed by the NCDR module 425 running in a bare metal monitor of the control node 510, row 1003 includes functions performed by a rest server in the control node 510, row 1004 includes functions performed by the crash kernel in the node 515, and row 1005 includes functions performed by the BMC 424 on the node 515.

In the example shown in FIG. 10, step 1011 includes the orchestration system detecting an event associated with a node and reporting the event to an event handler 1013 of the NCDR module 425. As described herein, the event may include the orchestration system detecting that the node 515 is in an unavailable state (e.g., NotReady). At step 1012, the crash kernel 570 reports a crash event of the node 515 to the event handler 1013. At step 1013, based on a request from the event handler 1013, the DB service 560 queries the database 555 to obtain information associated with the BMC 424 of the node 515. At step 1015, the NCDR module 425 collects the BMC data from the database 555. At step 1016, the NCDR module 425 initiates the first and second probes of the node 515 as described herein using the data obtained from the database 555. Step 1016 may include the NCDR module 425 performing the first probe by attempting to communicate with the crash kernel 570 on the node 515, and performing the second probe by examining the SOL console on the node 515 using SOL communication with the BMC 424 on the node 515.

With continued reference to the example shown in FIG. 10, at step 1017, the NCDR module 425 uses the results of the first and second probes to determine whether the node 515 is crashed. As described herein, if one or both of the probes confirms that the node has crashed, then the NCDR module 425 deems the node 515 to be a crashed node and initiates remediation. In the event the NCDR module 425 determines at step 1017 that the node 515 is not crashed, then the process proceeds to the exit where it ends without initiating remediation of the node 515. On the other hand, in the event the NCDR module 425 determines at step 1017 that the node 515 has crashed, then at step 1018 the NCDR module 425 causes the deletion of the node from the node cluster, as indicated by step 1019 where the orchestration system deletes the node from the cluster. At step 1020, the NCDR module 425 uses the DB service 560 to read the BMC passwords from the database, as indicated at step 1021. At step 1022, the NCDR module 425 uses the BMC 424 to power down the node 515. At step 1023, the NCDR module 425 uses the BMC 424 to change the BMC password of the node to the default BMC password.

Figure 11:
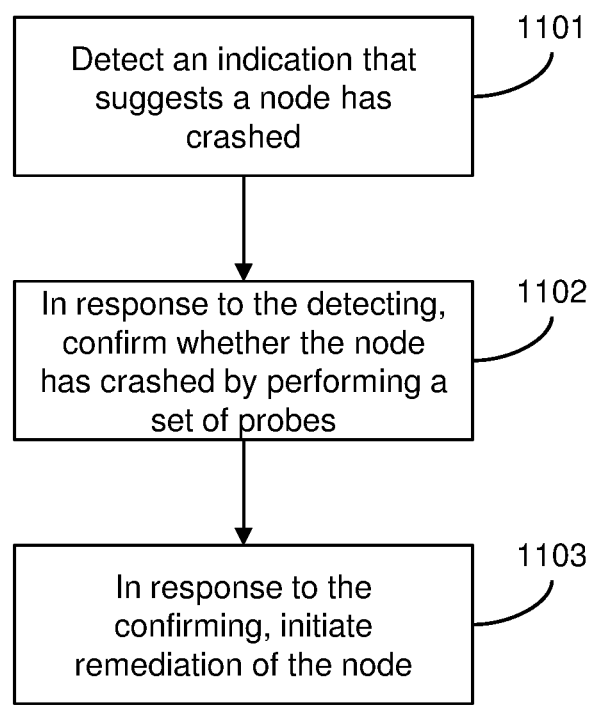
FIG. 11 shows a flowchart of an exemplary method in accordance with an embodiment of the invention.

FIG. 11 shows a flowchart of an exemplary method in accordance with aspects of the present invention. Steps of the method may be carried out in the environment of FIGS. 4 and 5 and are described with reference to elements depicted in FIGS. 4 and 5.

At step 1101, the system detects an indication that suggests a node has crashed. In embodiments, and as described with respect to FIG. 5, detecting the indication comprises one of: the NCDR module 425 detecting an unavailable status of the node from an orchestration system; the NCDR module 425 receiving an asynchronous crash notification; and the NCDR module 425 receiving a crash dump. As described herein, an unavailable status of the node can be an initial indicator that the node has crashed; however, this status, by itself, does not deterministically indicate that a node has crashed and can lead to false positive crash indications. Similarly, receiving an asynchronous crash notification from the node 515 is a strong indicator that the node 515 has crashed; however, such a notification can be sent in error, e.g., due to a bug, which would result in a false positive indication of a crash of the node 515 if relied on alone. Similarly, receiving a crash dump from the node 515 is a strong indicator that the node 515 has crashed; however, a crash dump can be sent in error, e.g., due to a bug, which would result in a false positive indication of a crash of the node 515 if relied on alone. Therefore, in some embodiments and in order to eliminate false positives, the NCDR module 425 treats all three of these indications as a suggestion that the node 515 has crashed, and the NCDR 425 follows up on this suggestion in successive steps of the method.

At step 1102, in response to the detecting, the system determines whether the node has crashed by performing a set of probes on the node. In embodiments, and as described with respect to FIG. 5, the NCDR module 425 performs a first probe and a second probe on the node 515 for the purpose of confirming whether the node 515 has indeed experienced a kernel crash. The set of probes may include: a first probe that attempts to communicate with a crash kernel 570 on the node 515; and a second probe that determines whether a prompt of the crash kernel 570 is present in a console of the node. The first probe may include sending a communication that is directed to the crash kernel. The communication may comprise an API call to the crash kernel using Hypertext Transfer Protocol Secure (HTTPS). For the second probe, the console may comprise a Serial Over LAN (SOL) console 580 of the node 515. The second probe may comprise accessing the console via a Baseboard Management Controller (BMC) 424 of the node using SOL communication.

At step 1103, in response to the confirming that the node has crashed, the system initiates a remediation of the node. In embodiments, and as described with respect to FIG. 5, the NCDR module 425 initiates remediation of the node 515. The remediation may comprise: removing the node from a cluster; obtaining credentials for accessing a Baseboard Management Controller (BMC) of the node; changing the credentials to a predefined default; powering down the node; storing crash dump data from the node in persistent storage; and generating an operator crash notification to continue manual remediation.

Figure 12:
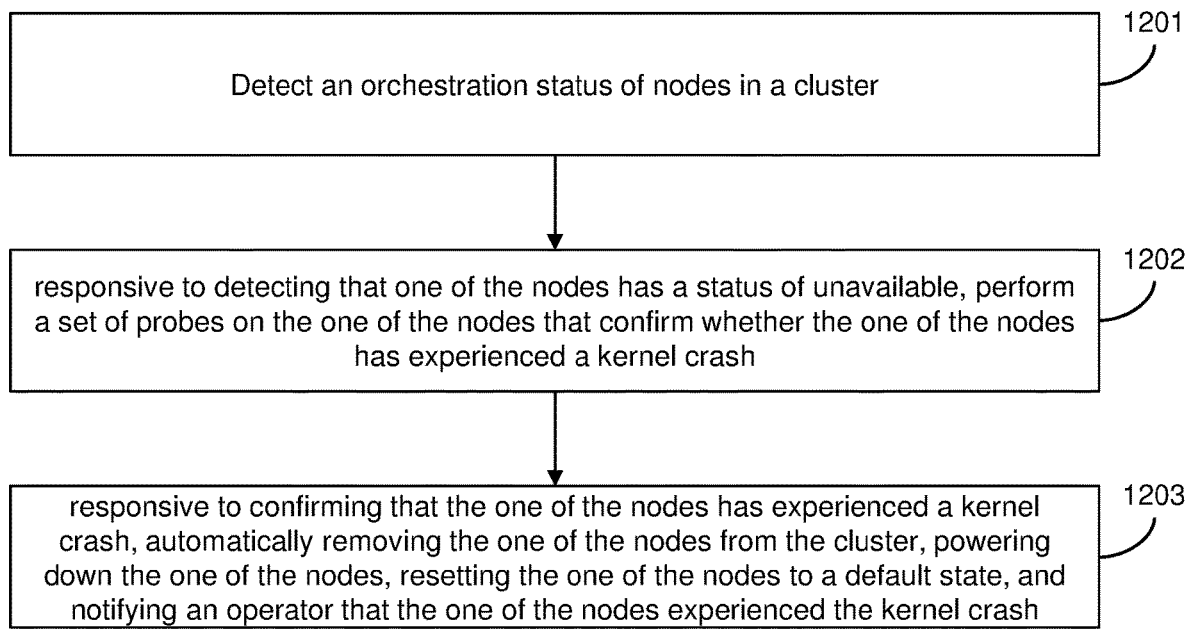
FIG. 12 shows a flowchart of an exemplary method in accordance with an embodiment of the invention.

FIG. 12 shows a flowchart of an exemplary method in accordance with aspects of the present invention. Steps of the method may be carried out in the environment of FIGS. 4 and 5 and are described with reference to elements depicted in FIGS. 4 and 5. At step 1201, the NCDR module 425 detects an orchestration status of nodes 415 in a cluster. At step 1202, responsive to detecting that one of the nodes 515 has a status of unavailable, the NCDR module 425 performs a set of probes on the one of the nodes that confirm whether the one of the nodes has experienced a kernel crash. At step 1202, responsive to confirming that the one of the nodes has experienced a kernel crash, the NCDR module 425 automatically removes the one of the nodes from the cluster, powers down the one of the nodes, resets the one of the nodes to a default state, and notifies an operator that the one of the nodes experienced the kernel crash In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   detecting, by one or more processors, an indication that suggests a node has crashed, wherein the node is included in a distributed computing environment;
   in response to the detecting, confirming by the one or more processors whether the node has crashed by performing a set of probes on the node; and
   in response to the confirming that the node has crashed, initiating by the one or more processors a remediation of the node, wherein the remediation comprises: obtaining credentials for accessing a Baseboard Management Controller (BMC) of the node; and changing the credentials to a predefined default.

2. The method of claim 1, wherein the detecting the indication comprises detecting an unavailable status of the node from an orchestration system.

3. The method of claim 1, wherein the detecting the indication comprises receiving an asynchronous crash notification.

4. The method of claim 1, wherein the detecting the indication comprises receiving a crash dump.

5. The method of claim 1, wherein the set of probes includes:
   a first probe that attempts to communicate with a crash kernel on the node; and
   a second probe that determines whether a prompt of the crash kernel is present in a console of the node.

6. The method of claim 5, wherein the first probe includes sending a communication that is directed to the crash kernel.

7. The method of claim 6, wherein the communication comprises an API call to the crash kernel over Hypertext Transfer Protocol Secure (HTTPS).

8. The method of claim 5, wherein, for the second probe, the console comprises a Serial Over LAN (SOL) console of the node.

9. The method of claim 8, wherein the second probe comprises accessing the console via the Baseboard Management Controller (BMC) of the node using SOL communication.

10. The method of claim 1, wherein the remediation comprises:
   removing the node from a cluster;
   powering down the node;
   storing crash dump data from the node in persistent storage; and
   generating an operator crash notification to continue manual remediation.

11. The method of claim 1, wherein:
   the node is included in a cluster in the distributed computing environment; and
   the detecting, the confirming, and the initiating are performed by a control node in the cluster.

12. The method of claim 11, wherein the detecting, the confirming, and the initiating are performed by a microservice running on the control node.

13. A computer program product comprising one or more computer readable storage media having program instructions collectively stored on the one or more computer readable storage media, the program instructions executable to:
   detect a node has an unavailable status, wherein the node is included in a cluster in a distributed computing environment;
   in response to the detecting, confirm whether the node has crashed by performing a set of probes on the node; and
   in response to the confirming that the node has crashed, initiate a remediation of the node,
   wherein the set of probes includes: a first probe; and a second probe that determines whether a prompt of a crash kernel is present in a console of the node.

14. The computer program product of claim 13, wherein the node is configured to load the crash kernel in response to kernel panic.

15. The computer program product of claim 14, wherein the first probe attempts to communicate with the crash kernel.

16. The computer program product of claim 15, wherein:
   the first probe includes a Hypertext Transfer Protocol Secure (HTTPS) communication to the crash kernel; and
   the second probe includes a Serial Over LAN (SOL) communication to a console on the node via a Baseboard Management Controller (BMC) of the node.

17. The computer program product of claim 15, wherein the remediation comprises:
   removing the node from a cluster;
   obtaining credentials for accessing a Baseboard Management Controller (BMC) of the node;
   changing the credentials to a predefined default;
   powering down the node;
   storing crash dump data from the node in persistent storage; and
   generating an operator crash notification to continue manual remediation.

18. A system for automatically detecting and remediating a node crash in a distributed computing environment, the system comprising:
   one or more processors, one or more computer readable storage media, and program instructions collectively stored on the one or more computer readable storage media, the program instructions executable by the one or more processors to:
   detect an orchestration status of nodes in a cluster;
   responsive to detecting that one of the nodes has a status of unavailable, perform a set of probes on the one of the nodes that confirm whether the one of the nodes has experienced a kernel crash; and
   responsive to confirming that the one of the nodes has experienced a kernel crash, automatically removing the one of the nodes from the cluster, powering down the one of the nodes, resetting the one of the nodes to a default state, and notifying an operator that the one of the nodes experienced the kernel crash.

19. The system of claim 18, wherein the set of probes includes;
   a first probe that includes a Hypertext Transfer Protocol Secure (HTTPS) communication to a crash kernel that is expected to be on the one of the nodes; and
   a second probe that includes a Serial Over LAN (SOL) communication to a console on the one of the nodes via a Baseboard Management Controller (BMC) of the one of the nodes.

20. The system of claim 18, wherein:
   a microservice running in a control plane of the cluster performs the set of probes; and
   the status of unavailable is based on the control plane not receiving an expected communication from an agent on the one of the nodes.

\* \* \* \* \*